Feb. 3, 1942.  C. G. STRANDLUND  2,271,748
HITCH DEVICE
Filed April 19, 1939  2 Sheets-Sheet 1
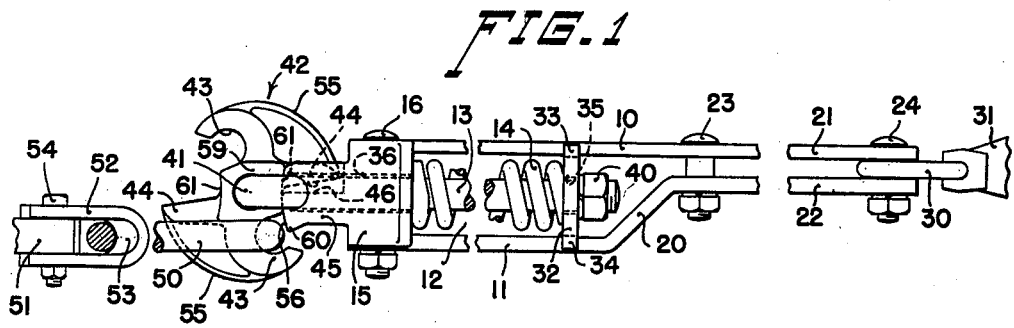
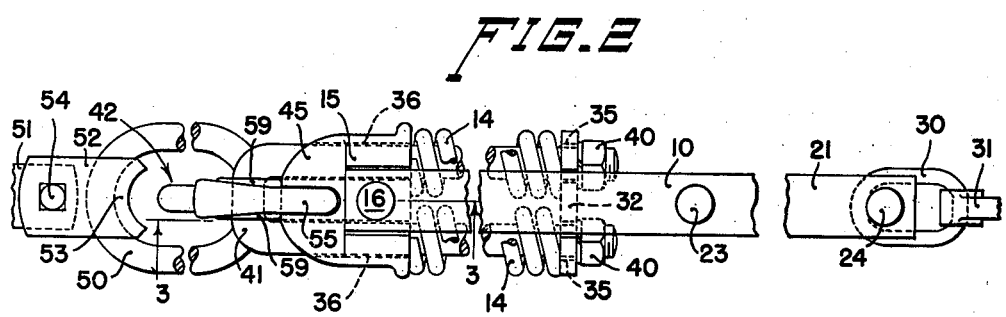
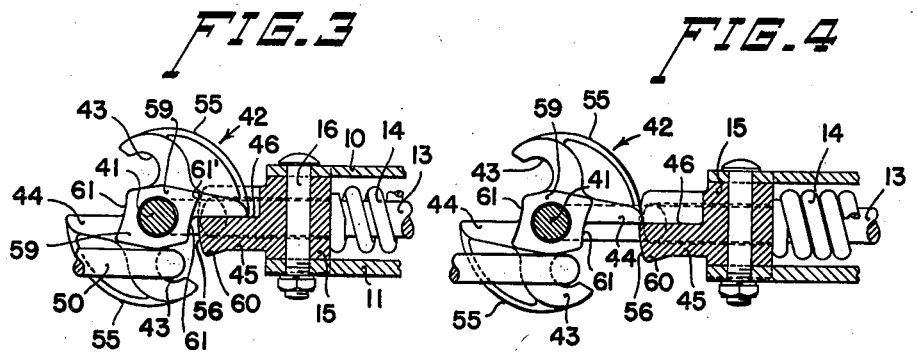
INVENTOR.
CARL G. STRANDLUND
ATTORNEYS Feb. 3, 1942.          C. G. STRANDLUND          2,271,748
                         HITCH DEVICE
                     Filed April 19, 1939          2 Sheets-Sheet 2
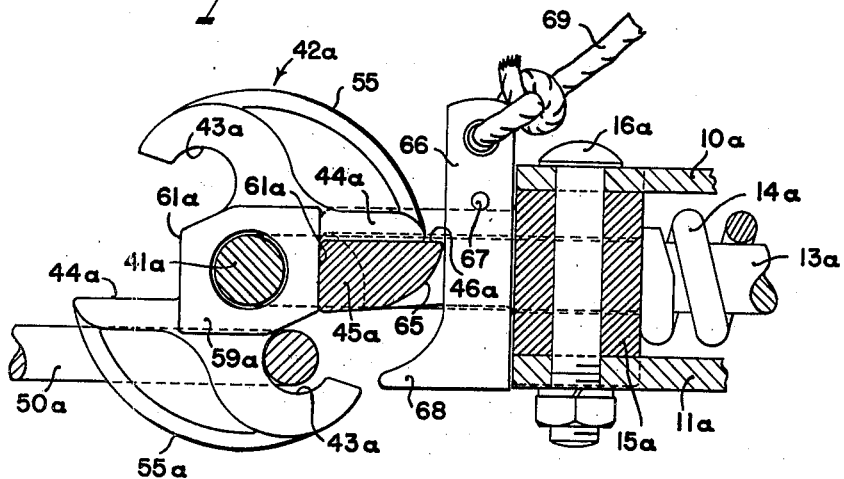
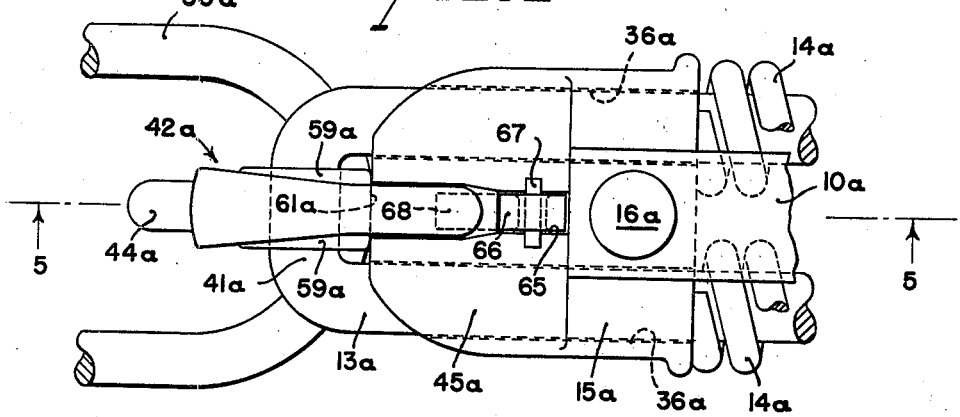
INVENTOR:
CARL G. STRANDLUND
ATTORNEYS.

Patented Feb. 3, 1942

2,271,748

UNITED STATES PATENT OFFICE 2,271,748

HITCH DEVICE

Carl G. Strandlund, Moline, Ill., assignor to Deere & Company, Moline, Ill., a corporation of Illinois Application April 19, 1939, Serial No. 268,731

13 Claims. (Cl. 280—33.16)

The present invention relates to releasable hitch devices such as are used for coupling agricultural implements to the propelling tractor, and has for its principal object to provide a new and improved hitch device that will remain operative under normal operating conditions, but will automatically release the tractor from the implement should the load become abnormally great, and thereby minimize the danger of breakage.

A further object of my invention is to provide a releasable hitch device in which the coupling member is automatically reset to operative or engaging position immediately upon releasing the implement from the tractor.

Still another object is to provide a hitch device in which the two releasable coupling members can be readily connected together with a minimum of effort, yet which is secure and non-releasable in the often necessary backward or reverse movements of the coupled mechanisms, such as in backing the implement away from the arresting obstruction, when the machines have been recoupled after release.

These and other objects and advantages of my invention will become apparent to those skilled in the art after consideration of the following detailed description of the preferred forms thereof, reference being had to the appended drawings, in which Figure 1 is a side elevation of a spring release hitch embodying the principles of my invention, certain parts thereof being broken out in order to conserve space;

Figure 2 is a plan view of the same;

Figure 3 is a sectional view, taken substantially along the line 3—3 in Figure 2, showing the arrangement of the various parts under normal load;

Figure 4 is a view similar to Figure 3 showing the positions of the coupling members at the instant of release due to an overload;

Figure 5 is a sectional view, taken along the line 5—5 in Figure 6, of a slightly modified form of my invention; and Figure 6 is a plan view of the same.

Referring now to the drawings, and more particularly to Figures 1-4, inclusive, my improved hitch comprises a frame or bracket composed of longitudinallly extending, spaced upper and lower bars 10, 11, between which are disposed a draft bolt 13 and compression springs 14, to be described in more detail presently.

The upper and lower bars 10, 11 are joined together at one end by an upright casting 15, and a bolt 16 is passed through vertically aligned holes in the bars and casting. The other end portion of the lower bar 11 is bent toward the bar 10, as shown at 20, to bring the extreme end of the bar 11 closer to the corresponding end of the upper bar 10, these two end portions being parallel as shown at 21, 22. Bolts 23 and 24 connect these parallel end portions of the two bars and serve as a means of attachment of the hitch device either to the load or to the drawing element, as may be preferred. In the drawings, the frame is represented as being connected to the implement, such connection being indicated by a link 30 carried by the front end of the implement draft member 31 and engaged by bolt 24.

Mounted to slide longitudinally between the bars 10, 11 is a transverse plate 32, which is somewhat wider than said bars, and has its upper and lower margins notched to receive said bars, leaving shoulders 33, 34 that overlap the sides of the bars and hold the plate against lateral displacement. The plate 32 is provided with two laterally spaced holes 35 which align with two corresponding holes 36 in the casting 15, and through these holes extend the legs of the U-shaped draft bolt 13, upon the inner end of each of which is screwed a nut 40 that abuts against the outer face of the plate 32 and is secured by a suitable lock washer. Coil springs 14 encircle each of the legs of the draft bolt 13, bearing at one end against the casting 15 and at the other end against the inner face of the plate 32.

Journaled on the bight portion 41 of the U-shaped draft bolt 13 is a rotatable coupling member, indicated in its entirety by the reference numeral 42. The coupling member 42 is preferably in the form of a generally circular casting having a pair of open-ended draft jaws, or hook portions 43 formed on the peripheral edge thereof diametrically opposite one another, one or the other of which is normally in operative or engaging position at all times. Also formed on the coupling member 42 are two shoulder portions 44 spaced 180 degrees apart and arranged so that one of them normally engages an abutment portion 45 on the casting 15 when the hitch is under normal load, as best shown in Figure 3. The abutment portion 45 extends forwardly beyond the front ends of the bars 10, 11, and is recessed to provide a horizontal shelf 46 disposed substantially in the plane defined by the legs of the draft bolt 13. The engaged shoulder 44 is adapted to bear down upon the shelf 46 and is longitudinally slidable thereon, providing limit stop means for holding the coupling member against rotation and in fixed angular relation to the hitch frame when the hitch is pulling a normal load. When the load becomes excessive, however, the draft bolt 13 and coupling member 42 are caused to move forwardly with respect to the frame, as shown in Figure 4, and the shoulder 44 slides over the end of the abutment 45, allowing the coupling member to rotate.

The operatively positioned draft jaw 43 of the coupling member normally engages a connecting member 50 which is represented in the drawings as being carried on the drawbar 51 of a tractor or other propelling vehicle. As shown, the connecting member 50 is in the form of a ring which passes through a clevis member 52 and is held thereby in a generally horizontally extending position by virtue of the fact that the clevis is formed from a relatively wide strap and has its arms spread apart a distance substantially equal to the thickness of the ring 50. The bight portion of the clevis is curved, as at 53, to conform with the curvature of the ring 50 so as to provide a continuous bearing surface between the ring and the clevis across the width of the latter, and the clevis is secured to the drawbar 51 by means of a bolt 54 passed through vertically aligned holes in the two members. The connecting member 50 is released from the draft jaw 43 by the rotation of the coupling member 42, which causes the draft jaw to rotate from a rearwardly facing operative position to a forwardly facing inoperative position.

It will be noted that as the springs 14 bear at one end against the casting 15 and at the other end against the plate 32, they tend to urge the draft bolt 13 rearwardly, or to the right as viewed in the drawings. By applying pulling force either to the frame or to the draft bolt 13 through the coupling member 42, the draft bolt is moved forwardly relative to the frame, compressing the springs 14. Thus, under normal load and within the range of movement permitted by the engagement of the shoulder 44 with the shelf 46 on the abutment, the hitch functions as a spring cushion draft device.

If, however, the resistance of the load should increase excessively, for example, if in plowing the plow should strike a serious obstacle, the springs 14 are compressed sufficiently to allow the shoulder 44 to move clear of the shaft 46, whereupon the draft pull exerted through the link 50 and the pull of the springs 14 exerted through the bolt 13 constitute, in effect, a couple acting on the member 42, causing it to rotate clockwise (Figures 1, 3 and 4). At about the time the hook portion 43 with which the link 50 is engaged approaches a position in outward alignment with the axis of rotation, at 41, one of the arcuate cam surfaces 55, provided on the coupling member 42, engages with a cooperating cam surface 56 on the end of the casting 15, the springs 14 acting against the coupling member 42 to complete its rotation and thus ensure the immediate release of the ring 50. To this end, radial distance from the axis of rotation of the coupling member to the cam surface 55 is constant from the outer lip of the shoulder 44 to the portion which is in contact with the surface 56 at the time the ring 50 slips out of the jaw 43 and then decreases more or less uniformly to a low point adjacent the opposite draft jaw 43. Thus, when the coupling member 42 is urged rearwardly by the springs 14, with one of the cam surfaces 55 engaging the cam surface 56 on the abutment 45, the reacting force is a clockwise torque exerted on the coupling member. Thus, there is no danger of the ring 50 getting hung on the hitch and not releasing. After the end of the arcuate surface, at the end of the other hook portion 42, clears the part 56, the springs 14 draw the coupling member 42 back until the surfaces 61 engage the end of the abutment 45 (Figure 4). Due to the angular relation of these parts, the force of the springs 14 continues the rotation of the coupling member 42 in a clockwise direction until the contacting surfaces are flat against one another, as shown in Figure 1. Thus, the springs 14 positively reset and hold the coupling member 42 in a position to be re-attached to the link 50.

The connecting member 50 is prevented from slipping out of engagement with the draft jaw 43 when there is no load on the hitch or when the tractor and implement are being backed up, by means of a downwardly projecting lug 60 on the abutment 45 which, together with the end of the draft jaw 43, restricts or blocks the rearward opening of the operatively positioned draft jaw to an extent preventing the connecting member 50 from being released therefrom. The coupling member 42 has a raised hub portion 59 which is provided with a pair of substantially flat faces 61 that are adapted to bear against the end of the abutment 45 when the coupling member is not under load, and which are disposed at an angle to the adjacent shoulder 44 such that when the face 61 is held flat against the end of the abutment by the springs 14, the corresponding shoulder is raised at an angle to the shelf 46, as shown in Figure 1. Accordingly, the coupling member can be rotated in a clockwise direction through such an angle before the shoulder contacts the shelf and thereby limits the member against further rotation. When a pull is exerted against the lower draft jaw 43, the coupling member 42 functions as a lever, with the upper corner 61' of the face 61 acting as a fulcrum (see Figure 3), to move the draft bolt 42 forwardly a short distance against the pressure of the springs 14. In this connection, it will be seen that the effort required to move the draft bolt through the short distance necessary to bring the shoulder 44 down against the shelf 46 is considerably less than the effort required to move the draft bolt through an equal distance after the shoulder has contacted the shelf, by virtue of the mechanical advantage obtained through the aforesaid lever action.

To couple the implement to the propelling tractor, the front end of the hitch is laid with the abutment portion 45 of the casting 15 resting on top of the horizontally extending connecting member 50, and the tractor is then driven forwardly. The end of the draft jaw 43 and the lug 60 have forwardly converging faces forming a wedge-shaped opening, and the pull of the tractor forces the coupling member to rock about the fulcrum 61' and thereby to allow the coupling member to slip into engagement with the draft jaw. Whenever the pull of the tractor slackens, the springs 14 urge the coupling member back tightly against the end of the abutment 45, as shown in Figure 1, so as to restrict the opening between the draft jaw and projection 60 and thus prevent the connecting member 50 from slipping out of the draft jaw. When it is desired to disconnect the implement from the tractor, the bolt 54 is removed and the connecting member 50 and clevis 52 are disconnected with the hitch.

In a second embodiment of my invention, illustrated in Figures 5 and 6, the hitch can be disconnected from the tractor without necessitating the removal of the clevis or connecting member. This second embodiment of my invention is generally similar to the previously described embodiment, and similar parts have, therefore, been given the same numbers with the suffix a. Referring now to Figures 5 and 6, the abutment portion 45a of the casting 15a is seen to have a vertical opening 65 within which is slidably disposed a link 66. A transverse pin 67 through the link 66 engages the top of the abutment 45a and limits the downward movement of the link. The lower end of the link is provided with a forwardly extending toe portion 68 which extends to within close proximity of the draft jaw 43a and blocks the rearward opening of the draft jaw against the accidental release of the connecting member 50a. Being slidable in the frame 10a, 11a transversely with respect to the direction of draft pull, the part 66 sustains rearwardly directed draft forces, thereby permitting the tractor to back the implement. The link 66 is raised by means of a trip rope 69, withdrawing the point 68 up into the opening 65 and clearing the opening between the draft jaw 43a and end of the casting 15a so that the hitch device can be lifted by the rope 69 and unhooked from the ring 50a after the tractor has been backed a short distance. Thus, it is unnecessary to remove the clevis and connecting member from the tractor drawbar, and they can be used with the spring release hitches of all implements so equipped. Inasmuch as the means employed in the present embodiment for retaining the connecting member 50a in the draft jaw 43a is more or less independent of the angular position of the coupling member 42a, the faces of the hub portions 61a are made perpendicular to the shoulders 44a, and the latter engage the shelf 46a when the hitch is under no load as well as when it is pulling a load.

What I claim as my invention is:

1. The combination with a spring release hitch device having a frame, a part slidably supported thereon, spring means for resisting sliding movement of said part relative to the frame in one direction, a coupling member rotatably supported on said part and having a normal engaging position, a connecting member adapted to engage with said coupling member and releasable therefrom by the rotation of the coupling member, and means on said coupling member engageable with said frame for holding the coupling member against rotation and in normal engaging position, said means being disengaged from said frame when the draft member has moved past a predetermined position with respect thereto and allowing the coupling member to rotate, of means forming cooperating faces on said coupling member and on said frame, respectively, the face on said coupling member facing generally in a direction opposite to said one direction and the cooperating face on said frame facing generally in said one direction, said faces serving as means, responsive to the thrust of said spring means, for holding said rotatable coupling member in position facilitating reengagement of the connecting member therewith.

2. The combination with a hitch device comprising a frame having an abutment at one end, a draft bolt shiftable relative to said abutment, spring means for resisting movement of the draft bolt relative to the frame, a generally circular coupling member journaled on said draft bolt and having a plurality of draft jaws disposed uniformly around the peripheral edge thereof, a plurality of shoulders on said coupling member corresponding in number and arrangement with said draft jaws, one of said shoulders being normally in engagement with said abutment at all times for holding said coupling member against rotation and with one of said draft jaws in operative position, and a connecting member engageable with the operatively positioned draft jaw and releasable therefrom by the rotation of the coupling member, said draft bolt being movable under excessive draft loads to disengage said shoulder from the abutment and allow the coupling member to rotate, of cam portions on said coupling member disposed between each of said shoulders and the succeeding draft jaw, each of said cam portions being adapted to bear against the end of the frame when its corresponding shoulder has been disengaged and to rotate said coupling member responsive to the thrust of said spring means until the succeeding shoulder engages said abutment, and cooperating means on said coupling member and said abutment for moving said coupling member into and holding the same in a position facilitating reattachment of said connecting member thereto.

3. A draft coupling device of the character described comprising, in combination, a frame having an abutment at one end thereof, a draft bolt supported on said frame for relative sliding movement, spring means for resisting such sliding movement of the draft bolt, a coupling member pivotally connected with said draft bolt and movable therewith, an open-ended draft jaw on said coupling member, limit stop means for limiting the rotation of said coupling member in one direction, a connecting member adapted to be engaged and held by said draft jaw, and means on said coupling member engageable with said abutment for rotating the coupling member in the other direction through a predetermined angle responsive to the thrust of said spring means, whereby the open end of said draft jaw is brought into close proximity with said abutment and is blocked thereby so that said connecting member is retained by said draft jaw.

4. A draft coupling device of the character described comprising, in combination, a frame having an abutment at one end thereof, a draft bolt supported on said frame for relative sliding movement, spring means for resisting such sliding movement of the draft bolt, a coupling member pivotally connected with said draft bolt and movable therewith, an open-ended draft jaw on said coupling member, a shoulder on said coupling member adapted to slidably bear against one side of said abutment for limiting the rotation of the coupling member in one direction and holding said draft jaw in operative position, a connecting member adapted to be engaged and held by said draft jaw, a substantially flat face on said coupling member adapted to bear against the substantially flat end of said abutment, said face being disposed at such an angle with respect to the line of movement of said draft bolt that when the thrust of said spring means holds said face in engagement with the end of said abutment said shoulder is held out of engagement with said abutment and the open end of said draft jaw is moved into close proximity with said abutment so that said connecting member is blocked against release from said draft jaw.

5. A draft coupling device of the character described comprising, in combination, a fore and aft extending frame, a draft bolt disposed for longitudinal movement relative thereto, spring means for resisting such movement of the draft bolt, a coupling member on said draft bolt having a draft jaw opening to the rear, a connecting member adapted to be engaged and held by said draft jaw, and a link disposed for vertical sliding movement with respect to said frame between operative and inoperative positions, said link in operative position being disposed to the rear of said draft jaw in close proximity therewith, whereby the opening in said draft jaw is blocked to prevent said connecting member from being accidentally disengaged from the draft jaw.

6. A draft coupling adapted to be connected with a connecting member, comprising a frame, a rotatable coupling member having at least one open hook-like draft receiving section adapted to receive said connecting member and to transmit a pull in one direction to said frame, spring means resisting rotation of said coupling member, and means separate from raised spring means and movable relative to said frame into a position behind said connecting member for blocking the open end of said draft receiving section so as to prevent said connecting member from being accidentally disengaged therefrom while accommodating rotation of said coupling member upon the occurrence of an overload.

7. A draft coupling comprising a frame, a draft transmitting member adapted to transmit draft thereto, a part mounted for movement relative to said frame and having means to receive said draft member, cushioning spring means yieldably accommodating a limited amount of movement of said part relative to said frame so as to absorb draft shocks and the like in normal operation, means providing for the release of said draft transmitting member after said cushioning spring means has yielded a certain amount, and means for sustaining rearwardly directed draft forces transmitted to said frame by said draft transmitting member, said means being movable generally away from said part to provide for attachment thereof to said draft transmitting member and generally toward said part so as to prevent release of said draft transmitting member and thereby be in a position to receive said rearwardly directed forces.

8. A coupling device for use with a draft transmitting part, comprising a member having an open draft receiving section adapted to be engaged with said part so as to receive draft therefrom transmitted to said member thereby in one direction, a part movable transversely of said member into a position relative to said sections so as to block release of said draft transmitting part therefrom in the opposite direction, and means unyieldingly holding said movable part against movement in said opposite direction away from said open section so that said movable part sustains rearwardly directed force.

9. A coupling device adapted to be attached to a draft transmitting member, said coupling device comprising means having a receiving section adapted to receive said draft transmitting member, latch means for retaining said draft transmitting member in said section, and cable means connected with said latch means for moving the same into inoperative position and for lifting said coupling device to the proper height to receive said draft transmitting member.

10. A coupling device adapted to be attached to a draft transmitting member, said coupling device comprising means having a draft receiving section adapted to receive said draft transmitting member, means for lifting said coupling device to the proper height to receive said draft transmitting member, and means responsive to the actuation of said lifting means generally in the lifting direction to condition the draft receiving section of said first means to receive said draft transmitting member.

11. A coupling device adapted to be attached to a draft transmitting member, said coupling device comprising a longitudinally disposed member having at its lower side means serving as a draft jaw opening to the rear, said draft jaw being adapted to receive said draft transmitting member, a link disposed for vertical sliding movement with respect to said longitudinal member between operative and inoperative positions, said link in operative position being disposed to the rear of said draft jaw in close proximity therewith, whereby the opening in said draft jaw is blocked to prevent said connecting member from being accidentally disengaged from the draft jaw, means connected with the upper end of said link for moving the latter from one position to the other, and means limiting the upward movement of the link relative to said longitudinal member, whereby said link controlling means is adapted to move the longitudinal coupling member into position relative to said draft transmitting member while holding the link in a position facilitating the attachment of the connecting member to said draft jaw means.

12. A coupling device comprising a frame member having a pair of openings extending longitudinally in laterally spaced apart relation and an opening extending generally transversely of the frame member between said first mentioned openings, a part movable relative to said frame member and including sections slidably disposed in said first mentioned openings, spring means resisting outward movement of said part relative to said frame member, a coupling member mounted on said movable member and having a draft receiving jaw, and a detent member slidably disposed in said second mentioned opening and carrying means adapted in one position to close the open portion of said jaw.

13. A draft coupling adapted to be connected with a connecting member, comprising a frame, a part mounted for generally sliding movement relative to said frame, spring means resisting said movement of said part, a coupling member mounted for rotation on said part and having a portion engaging said frame to prevent rotation of said coupling member until said part has been moved against the force of said spring means a distance sufficient to permit the disengagement of said portion from said frame, and means carried by said frame in a position sufficiently close to said coupling member to prevent the accidental disengagement of the connecting means from said coupling member when the latter is held in its retracted position by said spring means but sufficiently distant from the path of movement of said portion to accommodate the rotation of said coupling member upon the occurrence of an overload.

CARL G. STRANDLUND.

CERTIFICATE OF CORRECTION.

Patent No. 2,271,748. February 3, 1942.

CARL G. STRANDLUND.

It is hereby certified that error appears in the printed specification of the above numbered patent requiring correction as follows: Page 4, first column, line 24, claim 6, for "raised" read --said--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.